Figure 1:
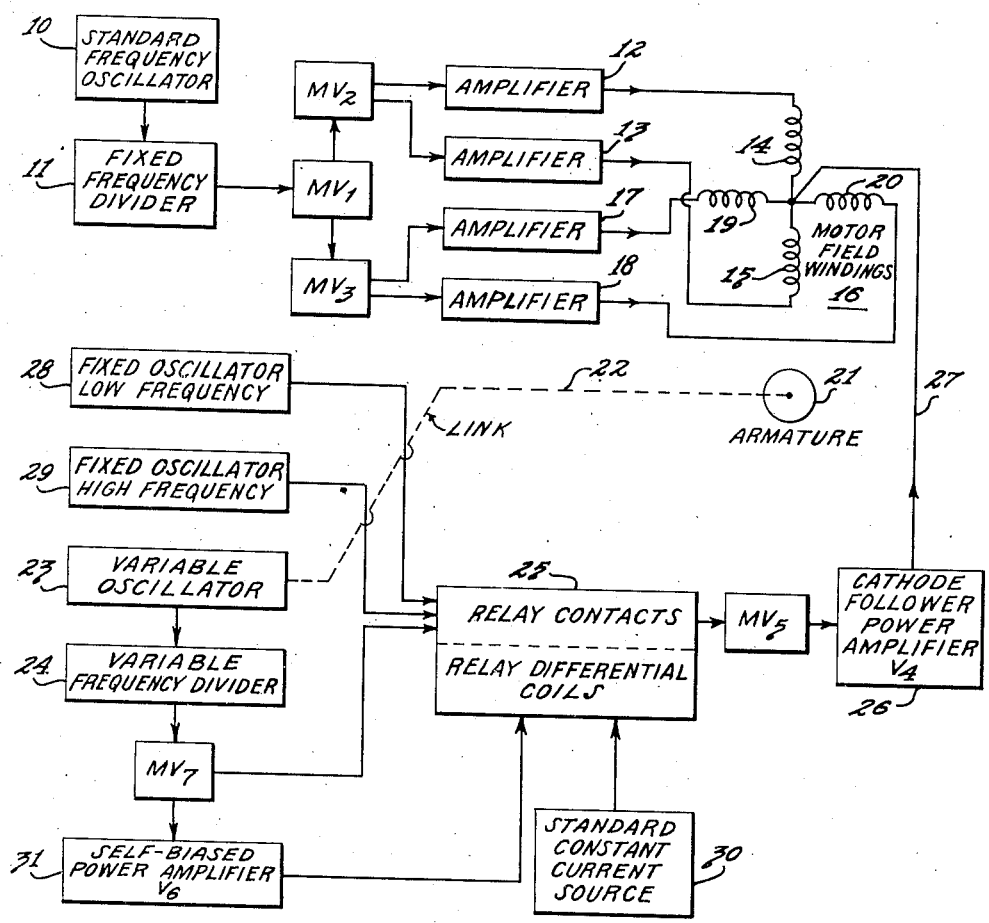

April 4, 1950

R. R. FREAS, JR 2,503,105

AUTOMATIC FREQUENCY CONTROL

Filed Sept. 30, 1947

2 Sheets-Sheet 1

INVENTOR.
Robert R. Freas, Jr.
BY
Morris A. Rabkin
ATTORNEY.

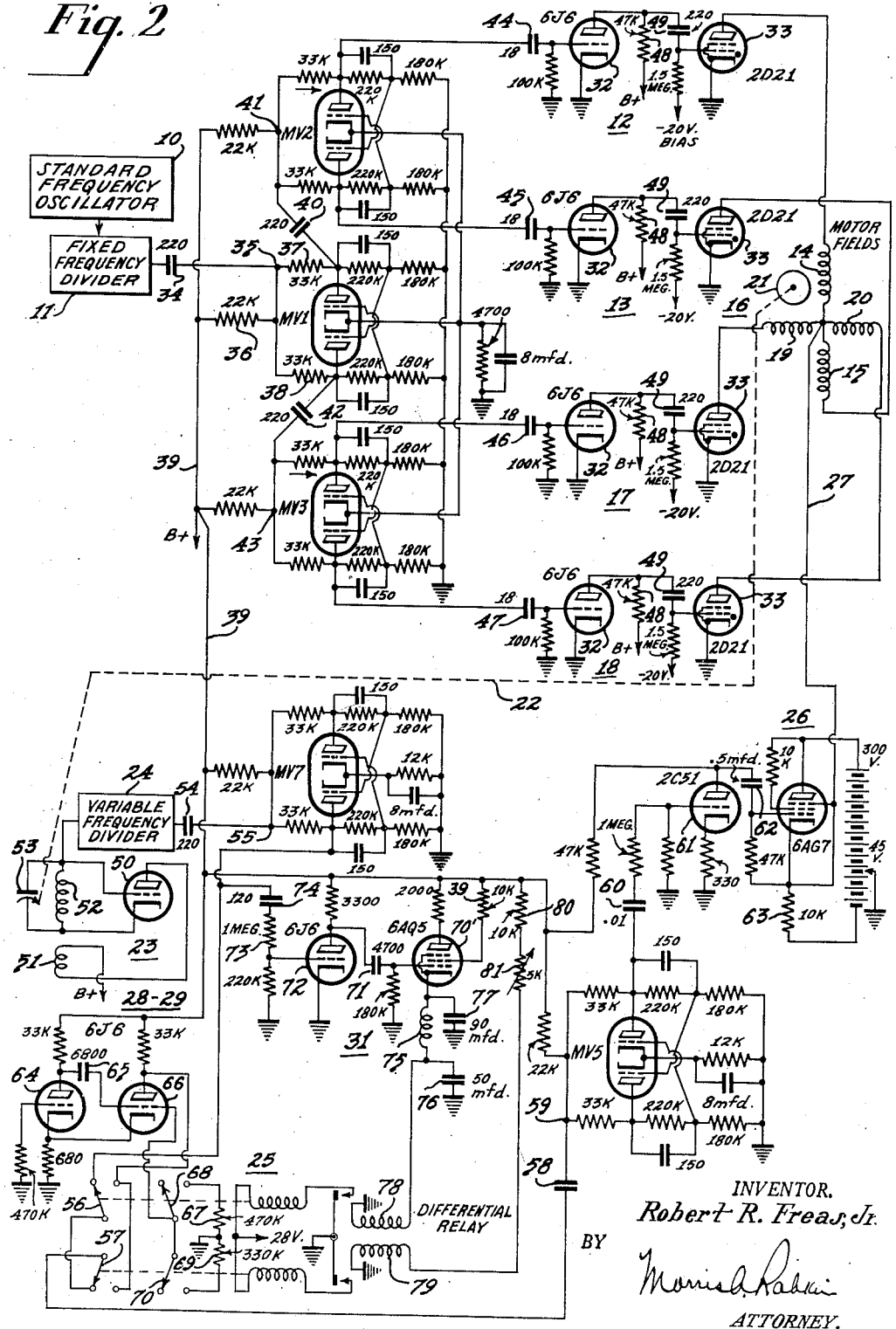

Patented Apr. 4, 1950

2,503,105

UNITED STATES PATENT OFFICE 2,503,105

AUTOMATIC FREQUENCY CONTROL

Robert R. Freas, Jr., Jermyn, Pa., assignor to Radio Corporation of America, a corporation of Delaware Application September 30, 1947, Serial No. 777,013

7 Claims. (Cl. 250—36)

This invention relates to the automatic frequency control of oscillation generators and has for its principal object the provision of an improved apparatus and method of operation whereby the output of a crystal controlled oscillation generator may be utilized (1) to regulate with crystal accuracy the output frequency of an oscillation generator which is not crystal controlled or (2) to regulate with crystal accuracy the output frequencies of an oscillation generator which is not crystal controlled and may be operated at a plurality of closely spaced, definite, predetermined frequencies.

In the illustrated form of the invention, these results are produced by means including a motor which has a rotor mechanically coupled to the frequency control element of the generator which is to have its frequency controlled or regulated. This motor has four stator windings arranged in quadrature and provided with a common terminal at one of their ends. To this common terminal is applied potential of a frequency proportional to that of the regulated generator, and to the other four terminals of the stator windings are applied potentials which have a frequency proportional to that of the crystal controlled generator and which are separated in phase by ninety electrical degrees.

The relation between the frequencies of the potentials applied to the different terminals of the stator windings is such that the motor produces no torque when the desired relation exists between the frequency of the regulated generator and that of the crystal controlled generator. When the frequency of the regulated generator tends to increase, however, the motor produces torque in a direction to decrease the frequency of the regulated generator. Likewise, when the frequency of the regulated generator tends to decrease, the motor produces torque in the opposite direction, thus increasing the frequency of the regulated generator.

Multivibrator circuits are utilized for maintaining the desired relation (1) between the frequencies of the crystal controlled generator and the potentials applied to the outer terminals of the stator windings and (2) between the frequency of the regulated generator and the potential applied to the common terminal of the stator windings.

These multivibrator circuits each include a pair of electron discharge elements having operating potential applied through a resistor which is common to their anodes and through separate resistors which are individual to the separate anodes. The anode of each electron discharge element is coupled to the grid of the other through a resistor shunted by a capacitor and the cathodes of the two elements are grounded through a resistor shunted by a capacitor.

With these connections, current conduction is stable in one or the other of the electron discharge elements and is transferred from one to the other of the elements in response to the application of a negative pulse at the junction between the common and separate resistors.

Because of the fact that the torque of the motor decreases rapidly with increase in speed, it is desirable that variation in the motor speed be maintained within predetermined limits. Such limits are maintained by means of fixed-frequency oscillation generator elements one of which takes control when the frequency of the regulated generator exceeds one predetermined limit and the other of which takes control when the frequency of the regulated generator goes beyond the other predetermined limit. Such control is maintained only during times when the torque of the motor otherwise would be insufficient to apply the required corrective effect to the frequency control element of the regulated generator. At the ends of such times, control is returned automatically to the output frequency of the regulated generator.

Important objects of the invention are the provision of an improved frequency control system which is capable of affording a large number of crystal controlled frequencies at given channel spacing from a regulated oscillation generator; the provision of an improved circuit for regulating the output frequency of an oscillation generator which is not crystal controlled; and the provision of an improved means for maintaining the speed of a control motor within such limits as to produce a torque greater than a predetermined minimum.

The invention will be better understood from the following description considered in connection with the accompanying drawings, and its scope is indicated by the appended claims.

Referring to the drawings:

Fig. 1 is a schematic diagram showing the relation between the various elements of the invention which are depicted in the form of boxes bearing explanatory legends, and Fig. 2 is a wiring diagram of the frequency control system of Fig. 1.

The automatic frequency control apparatus of Fig. 1 includes a crystal controlled oscillation generator 10 which delivers its output through a fixed frequency divider 11 to a multivibrator circuit or frequency divider MV₁. Connected to the two opposite anode leads of the divider MV₁ are similar frequency dividers MV₂ and MV₃. The anode leads of the divider MV₂ are connected through amplifiers 12 and 13 to the outside terminals of the field windings 14 and 15 of an induction motor 16. The anode terminals of the divider MV₃ are similarly connected through amplifiers 17 and 18 to the field windings 19 and 20 of the motor 16. Amplifiers 12, 13, 17 and 18 may each contain a triode amplifier section and a thyratron power amplifier section.

With these connections, there are applied to the terminals of the windings 14, 15, 19 and 20 potentials which (1) are displaced in phase by ninety electrical degrees and (2) assume their maximum values at successive instants of time.

The motor 16 includes a rotor 21 which is mechanically coupled through a shaft 22 (shown as a broken line) to an oscillation generator 23 which is to have its frequency regulated.

The generator 23 delivers its output through a variable frequency divider 24, a fixed frequency divider MV₇, the contacts of a relay 25 and a fixed frequency divider MV₅ to a cathode follower power amplifier 26 which is connected to the common lead 27 of the motor 16.

With these connections, there is applied to the anodes of the amplifiers 12, 13, 17 and 18, from the cathode follower 26 through the lead 27 and the stator windings 14, 15, 19 and 20, a potential which (1) is of square wave shape and (2) has a frequency directly proportional to the output frequency of the regulated generator 23.

Such of the thyratron sections of the amplifiers 12, 13, 17 and 18 as have a positive pulse applied from the amplifiers following the dividers MV₂ and MV₃ during positive half cycles of the potential applied through the lead 27 conduct current during the remainder of these positive half cycles. As a result, (1) the rotor 21 is stationary when the frequency of the generator 23 has a predetermined ratio to that of the generator 10, causing unity ratio between the frequencies of the plate and grid potentials of thyratron sections of amplifiers 12, 13, 17 and 18, (2) the rotor is rotated in one direction when this ratio increases, and (3) the rotor is rotated in the opposite direction when this ratio decreases.

As hereinafter explained, the rotor 21 is mechanically coupled to the frequency control element of the generator 23 so that there is maintained between the output frequencies of the crystal controlled generator 10 and the regulated generator 23 a ratio predetermined by the various frequency dividers interposed between these generators and the motor 16.

It has been indicated that the motor 16 loses torque rapidly as its speed increases. In order that its torque may be prevented from decreasing to a value insufficient to operate properly the frequency control element of the regulated generator 23, there are provided a pair of oscillation generators 28 and 29 having their output frequencies fixed at high and low values by which the maximum operating frequency of the divider is determined.

As hereinafter explained, one of the differential coils of the relay 25 is energized from a constant current source 30. The other differential coil of the relay is energized from the regulated generator 23 through the divider 24, the divider MV₇ and a self-biased amplifier 31. So long as the output frequency of the generator 23 is within its predetermined range, the contacts of the relay 25 are in a position to connect the divider MV₇ to the divider MV₅. When the frequency of the generator 23 increases above this range, however, the amplifier 31 functions through the relay 25 to switch the divider MV₅ from the divider MV₇ to the generator 28—29, and automatically inserting grid resistor 68 into this generator circuit such that it is caused to oscillate at a definite frequency which is a small percentage higher than the frequency which would be fed into MV₅ if the oscillation generator 23 were exactly at the desired frequency. Likewise, when the frequency of the generator 23 decreases below this range the amplifier functions through the relay 25 to switch the divider MV₅ from the divider MV₇ to the generator 28—29, and operating with lower frequency grid constants 67 switched in by relays 25. Whenever the frequency of the generator 23 is brought within the desired range, the relay 25 functions to connect the divider MV₅ to the divider MV₇. Thus the speed of the motor 16 is maintained within a range of values such that adequate torque is provided for reliable operation of the frequency control element of the regulated generator 23.

The circuit connections whereby these results are produced are shown in Fig. 2. In Figs. 1 and 2 the same reference numerals are used to indicate corresponding parts. In Fig. 2, one suitable set of values for the various parts of the circuit is indicated by legends placed adjacent the respective parts. The duotriodes utilized in the frequency dividers may be of the 2C51 type, for example.

It will be noted that the frequency dividers are of the two stability condition type previously discussed and that the amplifiers 12, 13, 17 and 18 each include an input triode 32 and an output tetrode 33 which is of the gaseous conduction type. As is well known, current conduction of such tetrode is started by the application of a positive pulse to its grid while a positive potential is applied to its anode, continues during the application of such positive potential to its anode, and is stopped by the interruption of such positive anode potential.

The frequency divider 11 is coupled through a capacitor 34 to the junction point 35 between the common anode resistor 36 and the separate anode resistors 37 and 38 through which operating potential is applied from a +B lead 39 to the anodes of the divider MV₁. With this connection, current conduction is shifted from one to the other anode of the divider MV₁ each time a negative pulse is applied to the point 35.

The divider MV₁ has one of its anodes coupled through a capacitor 40 to the junction point 41 of the divider MV₂ and the other of its anodes coupled through a capacitor 42 to the junction point 43 of the divider MV₃. With these connections, there are applied to the junction points 41 and 43 negative pulses which (1) have a frequency one-half that of the negative pulses applied to the junction point 35 and (2) are spaced from one another by equal time intervals.

The dividers MV₂ and MV₃ operate in the same manner as the divider MV₁ and have coupled to each of their anodes through a capacitor 44, 45, 46 or 47 the grid of a different one of the triodes 32 of the amplifiers 12, 13, 17 and 18. With these connections, there are applied to the grids of the triodes 32 of the amplifiers 12, 13, 17 and 18 negative pulses which have a frequency onefourth that of the pulses applied to the junction point 35 and are displaced from one another in phase by ninety electrical degrees.

Such negative pulses function to decrease the current drawn through a resistor 48 by the triode 32, thus applying a more positive potential through a capacitor 49 to the control grid of the gaseous conduction tetrode 33. How these more positive pulses are shifted from one to another of the tetrodes connected to the stator windings 14, 15, 19 and 20 is determined by the current conductive conditions of the dividers $MV_2$ and $MV_3$.

Thus if the start of current conduction in the upper anodes of the dividers $MV_2$ and $MV_3$, as indicated by the arrows adjacent the individual anode resistors, should occur during the application of a positive potential through the common lead 27, current is conducted by the stator windings 14 and 19. This current will endure for the time between the application of the positive pulse to the grid of the thyratron 33 and the loss of the positive voltage on lead 27.

The application of a negative pulse to the junction point 35 shifts current conduction to the lower anode of the divider $MV_1$, thus applying through the capacitor 42 to the junction point 43 a negative pulse by which current conduction is shifted from the upper to the lower anode of the divider $MV_3$.

The next negative pulse applied to the junction point 35 functions to transfer current conduction to the upper anode of the divider $MV_1$. This causes a negative pulse to be applied through the capacitor 40 to the junction point 41, with the result that current conduction is shifted from the upper to the lower anode of the divider $MV_2$. Each time a multivibrator plate goes from the cut-off to the conducting condition, a negative pulse is caused at the grid of amplifier 32 by the differentiating circuit connected thereto. Inversion of this pulse by amplifier 32 places a positive pulse at the thyratron 33 grid at this time. Thus the timing of the thyratron grid pulses is controlled by the standard frequency oscillator.

Whether or not a positive potential is applied to the lead 27 at such times as one of the tetrodes 33 is receiving positive grid pulses is determined (1) by the output frequency of the regulated generator 23 during the range of frequencies over which the torque of the motor 20 is adequate and (2) by the output frequencies of the generator 28 or 29 when the frequency of the regulated motor departs from this range (hereinafter sometimes called the normal range) in either direction.

In Fig. 2, the regulated generator is illustrated as including a triode 50 which has operating potential applied to its anode through a tickler coil 51 and has connected in its grid circuit a coil 52 which is inductively related to the coil 51 and is shunted by a capacitor 53 varied by movement of the motor shaft 22.

The output frequency of the regulated generator 23 is applied through the divider 24 and a capacitor 54 to the junction point 55 of the divider $MV_7$. The lower anode of the divider $MV_7$, during the normal frequency range of the generator 23, is connected through the contacts 56 and 57 of the relay 25 and a capacitor 58 to the junction point 59 of the divider $MV_5$. The upper anode of the divider $MV_5$ is connected through a capacitor 60 to the control grid of a triode 61 which has its output circuit coupled through a capacitor 62 to the input circuit of the cathode follower 26.

With these connections, there is applied from the upper terminal of a cathode lead resistor 63 to the lead 27 alternating potential which has a square wave shape and has a frequency directly proportional to the output frequency of the regulated generator 23. During positive half cycles of this alternating potential, current is started through the tetrodes 33 whenever a positive pulse is applied to their grids and continues until the ends of such positive half cycles.

It is desirable that the frequency division ratios be made such that the output frequency of the divider $MV_5$ is kept near that of the dividers $MV_2$ and $MV_3$. This is so because the speed of the motor 16 is directly proportional to the difference between the output frequency of the divider $MV_5$ and that of the dividers $MV_2$ and $MV_3$, and the torque of the motor decreases rapidly with increase in its speed.

Under these conditions, the dividers $MV_2$ and $MV_3$ function with the cathode follower 26 to form two balanced modulators delivering to the windings 14, 15, 19 and 20 an average current of a frequency which is equal to the difference between the output frequency of the cathode follower and that of the dividers $MV_2$ and $MV_3$. The rotating magnetic field of the motor 16 is also of this difference frequency, since the plate current of the tetrodes 33 flows through the motor windings. As the difference frequency passes through zero, the rotational direction of the magnetic field and the armature 21 is reversed. In this way the variable capacitor 53 controlling the frequency of the regulated generator 23 is made to rotate in the direction required to restore the frequency of the generator 23 to the desired relation with that of the crystal controlled generator 10.

In order to restrict the input frequency of the divider $MV_5$ to its normal range, two fixed frequency generators 28 and 29 are provided, one operating above the input frequency of the dividers $MV_2$ and $MV_3$ and the other operating below this input frequency. The frequencies of the generators 28 and 29 with respect to the frequency of the dividers $MV_2$ and $MV_3$ determine the maximum deviation of the input frequency of the divider $MV_5$.

The fixed frequency generators are shown as separate boxes 28 and 29 in Fig. 1. In Fig. 2 they are shown as a single generator which includes a triode 64 having its anode coupled through a capacitor 65 to the grid of a triode 66. The output frequency of this generator is delivered from the anode of the triode 66 at one frequency when the relay 25 is operated to connect the grid of the triode to ground through a resistor 67 and a contact 68 and at another frequency when this grid is grounded through a resistor 69 and a contact 70.

Operation of the relay 25 is controlled by a self-biased amplifier 70' which is connected to the lower anode of the divider $MV_7$ through a capacitor 71, a triode 72, a resistor 73 and a capacitor 74. The cathode of the amplifier 70' is grounded through an inductor 75 and a capacitor 76, which are shunted by a capacitor 77. The plate current of the amplifier 70' flows through one winding 78 of the relay 25. The constants of these various elements are so related that the average D.-C. plate current of the amplifier 70' varies inversely with the output frequency of the divider $MV_7$.

The other coil 79 of the relay 25 is supplied with constant current from the +B lead 39 through resistors 80 and 81. The relay 25 is so adjusted that if the output frequency of the divider MV7 (which is one-half that of the variable divider 24) lies within the normal frequency band between the frequencies of the two fixed oscillators, the contacts of the relay are in their illustrated positions and the output of the divider MV7 is delivered directly to the divider MV5. When the frequency of the regulated generator 23 departs in either direction from this normal band, however, the contacts 56 and 68 or the contacts 57 and 70 are moved to their opposite closed position, thereby setting upper and lower limits to the range of frequencies supplied to the divider MV5.

The motor field inductance of the described automatic frequency control apparatus puts a limit to the highest frequency at which the motor input voltage 27 may operate. This does not limit the frequency range of the oscillator, however. A particular use of the invention is that of providing a large number of definite frequencies at predetermined channel spacings controlled by the crystal oscillation generator 23. Such frequencies may be selected by changing the division ratio of the variable frequency divider 24.

What the invention provides is an improved automatic frequency control apparatus and method of operation by which one crystal controlled generator operating at radio or audio frequencies may be made to control with crystal accuracy any desired number of output frequencies which may be spaced so as to vary over the audio and radio frequency ranges.

What I claim is:

1. The combination of a crystal controlled oscillation generator, a frequency regulated generator, means for converting the output of said crystal controlled generator to potentials displaced from one another in phase and having a frequency different from and proportional to that of said crystal controlled generator; means for producing an alternating potential having a frequency different from and proportional to that of said regulated generator, a polyphase motor including windings which have a common terminal and each of which windings has a separate terminal connected to have applied to it a different one of said phase-displaced potentials, and means connected to apply said alternating potential to said common terminal for regulating the frequency of said regulated generator.

2. The combination of a crystal controlled oscillation generator, a frequency regulated generator, means for converting the output of said crystal controlled generator to potentials displaced from one another in phase and having a frequency different from and proportional to that of said crystal controlled generator; means for producing an alternating potential having a frequency different from and proportional to that of said regulated generator, means responsive to said phase-displaced and said alternating potentials for regulating the frequency of said regulated generator, and relay means responsive to departure of the output frequency of said regulated generator from a predetermined frequency range for fixing limits to variation in the frequency of said alternating potential.

3. The combination of a crystal controlled oscillation generator, a frequency regulated generator, means for converting the output of said crystal controlled generator to potentials displaced from one another in phase and having a frequency different from and proportional to that of said crystal controlled generator; means for producing an alternating potential having a frequency different from and proportional to that of said regulated generator, a polyphase motor including windings which have a common terminal and each of which windings has a separate terminal connected to have applied to it a different one of said phase-displaced potentials, and means connected to apply said alternating potential to said common terminal for regulating the frequency of said regulated generator.

4. The combination of a standard frequency oscillation generator, a frequency regulated generator, a plurality of frequency dividers interconnected to provide potentials which are displaced in phase and have a frequency proportional to said standard frequency, means for producing an alternating potential having a frequency different from and proportional to that of said regulated generator, a polyphase motor including windings which have a common terminal and each of which windings has a separate terminal connected to have applied to it a different one of said phase-displaced potentials, and means connected to apply said alternating potential to said common terminal for regulating the frequency of said regulated generator.

5. The combination of a standard frequency oscillation generator, a frequency regulated generator, means for converting said standard frequency to potentials which are displaced in phase and have a frequency different from and proportional to said standard frequency, a cathode follower, a plurality of frequency dividers arranged to be connected between said regulated generator and said cathode follower for causing said cathode follower to deliver an alternating current of a frequency proportional to that of said regulated generator, a polyphase motor including windings which have a common terminal and each of which windings has a separate terminal connected to have applied to it a different one of said phase-displaced potentials, and means connected to apply said alternating potential to said common terminal for regulating the frequency of said regulated generator.

6. The combination of a standard frequency oscillation generator, a frequency regulated generator, means for converting said standard frequency to potentials which are displaced in phase and have a frequency different from and proportional to said standard frequency, means including a plurality of frequency dividers connected to said regulated generator for producing an alternating current of a frequency proportional to that of said regulated generator, means responsive to said phase-displaced and alternating potentials for regulating the frequency of said regulated generator over a predetermined range, means for producing two frequencies fixed in value at the upper and lower limits of said range, and means for switching one of said dividers from said regulated generator to one of said fixed frequency producing means in response to departure of the frequency of said regulated generator from said range.

7. The combination of a standard frequency oscillation generator, a frequency regulated generator, means for converting said standard frequency to potentials which are displaced in phase and have a frequency different from and proportional to said standard frequency, means including a plurality of frequency dividers connected to said regulated generator for producing an alternating current of a frequency proportional to that of said regulated generator, means responsive to said phase-displaced and alternating potentials for regulating the frequency of said regulated generator over a determined range, means for producing two frequencies fixed in value at the upper and lower limits of said range, and means including a polarized relay responsive to the output frequency of said regulated generator for switching one of said frequency dividers from said regulated frequency generator to one or the other of said fixed frequency producing means in response to the departure of the frequency of said regulated generator from said range.

ROBERT R. FREAS, Jr.

REFERENCES CITED

The following references are of record in the file of this patent:

UNITED STATES PATENTS

| Number | Name | Date |
|---|---|---|
| 2,018,820 | Usselman | Oct. 29, 1935 |
| 2,058,114 | Usselman | Oct. 20, 1936 |
| 2,201,978 | Bedford | May 28, 1940 |